(No Model.) 6 Sheets—Sheet 1.

J. R. WILLIAMS.
CIGAR BUNCHING MACHINE.

No. 380,969. Patented Apr. 10, 1888.

WITNESSES: R. A. Porteous. W. A. C. Matthis

INVENTOR: John R. Williams,
BY Chas. C. Gill. ATTY (No Model.)

J. R. WILLIAMS.
CIGAR BUNCHING MACHINE.

No. 380,969. Patented Apr. 10, 1888.

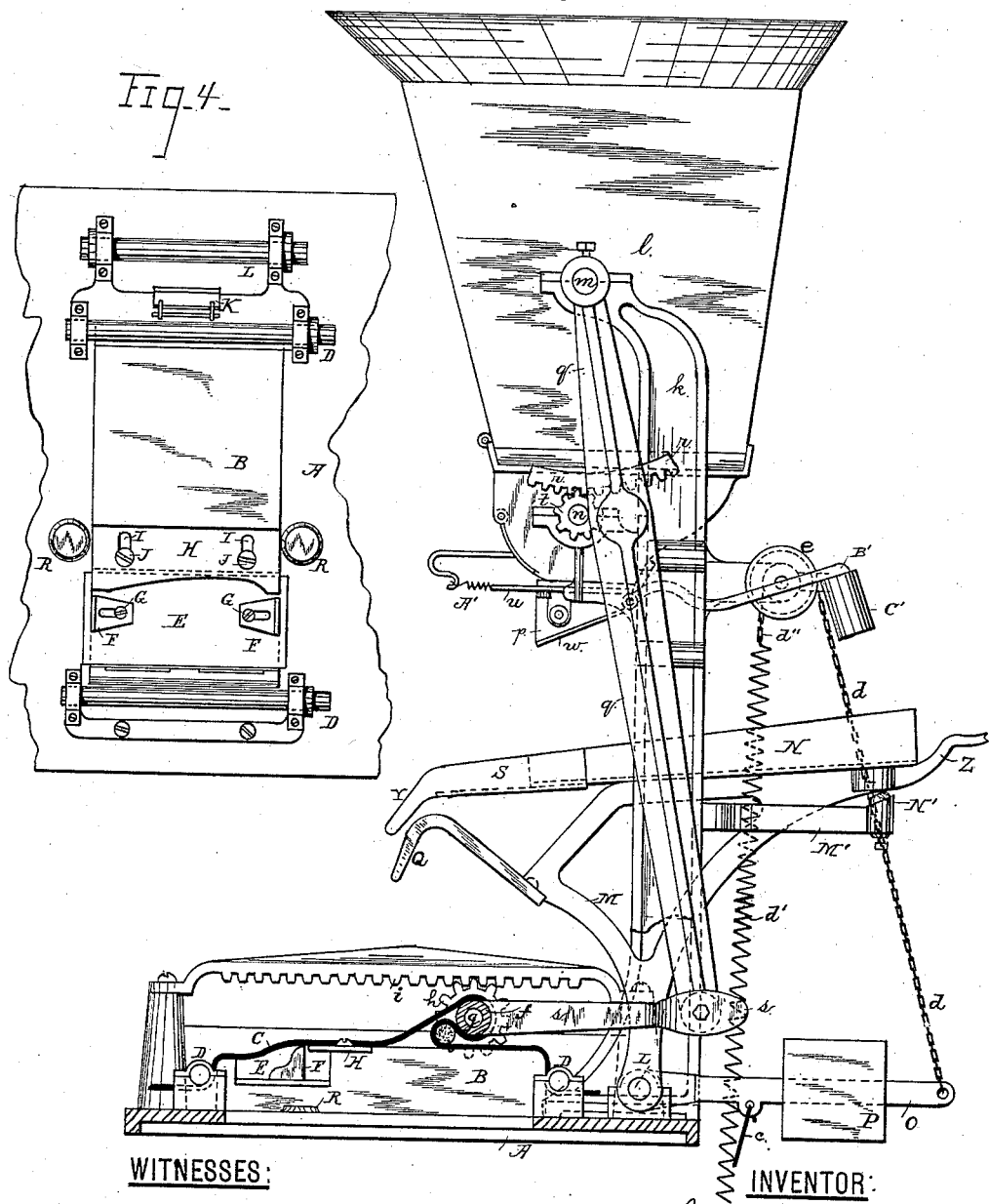

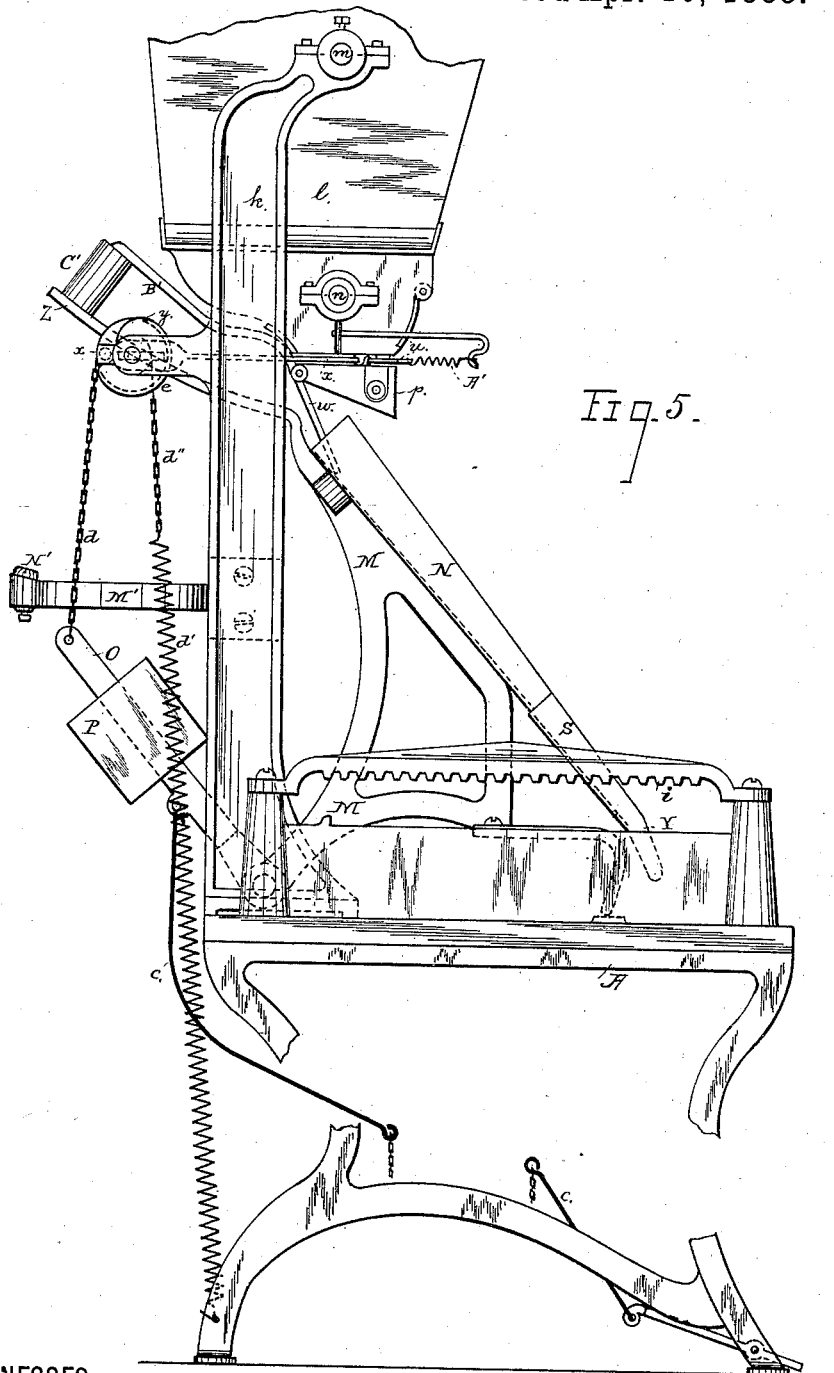

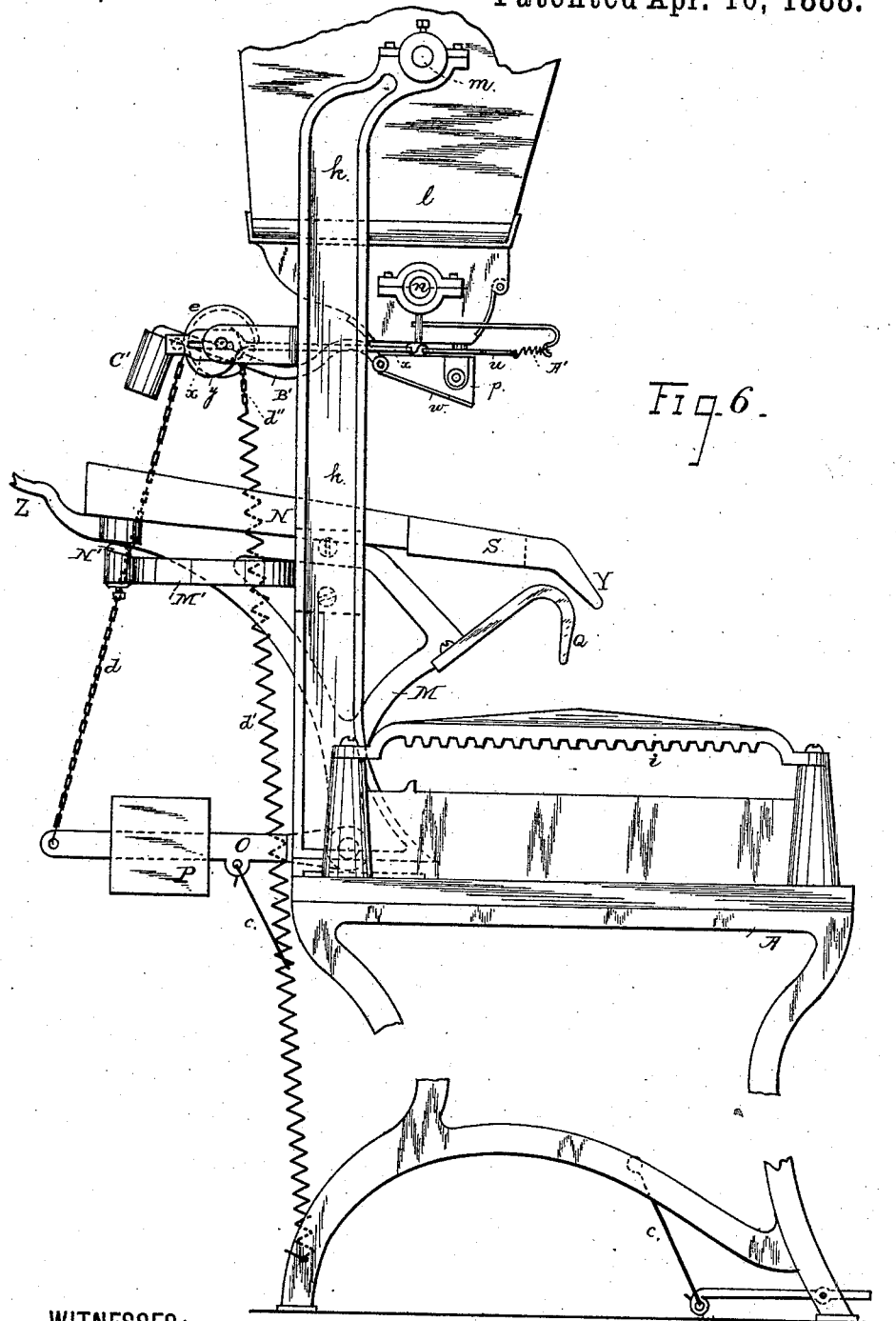

(No Model.) 6 Sheets—Sheet 6.
J. R. WILLIAMS.
CIGAR BUNCHING MACHINE.
No. 380,969. Patented Apr. 10, 1888.
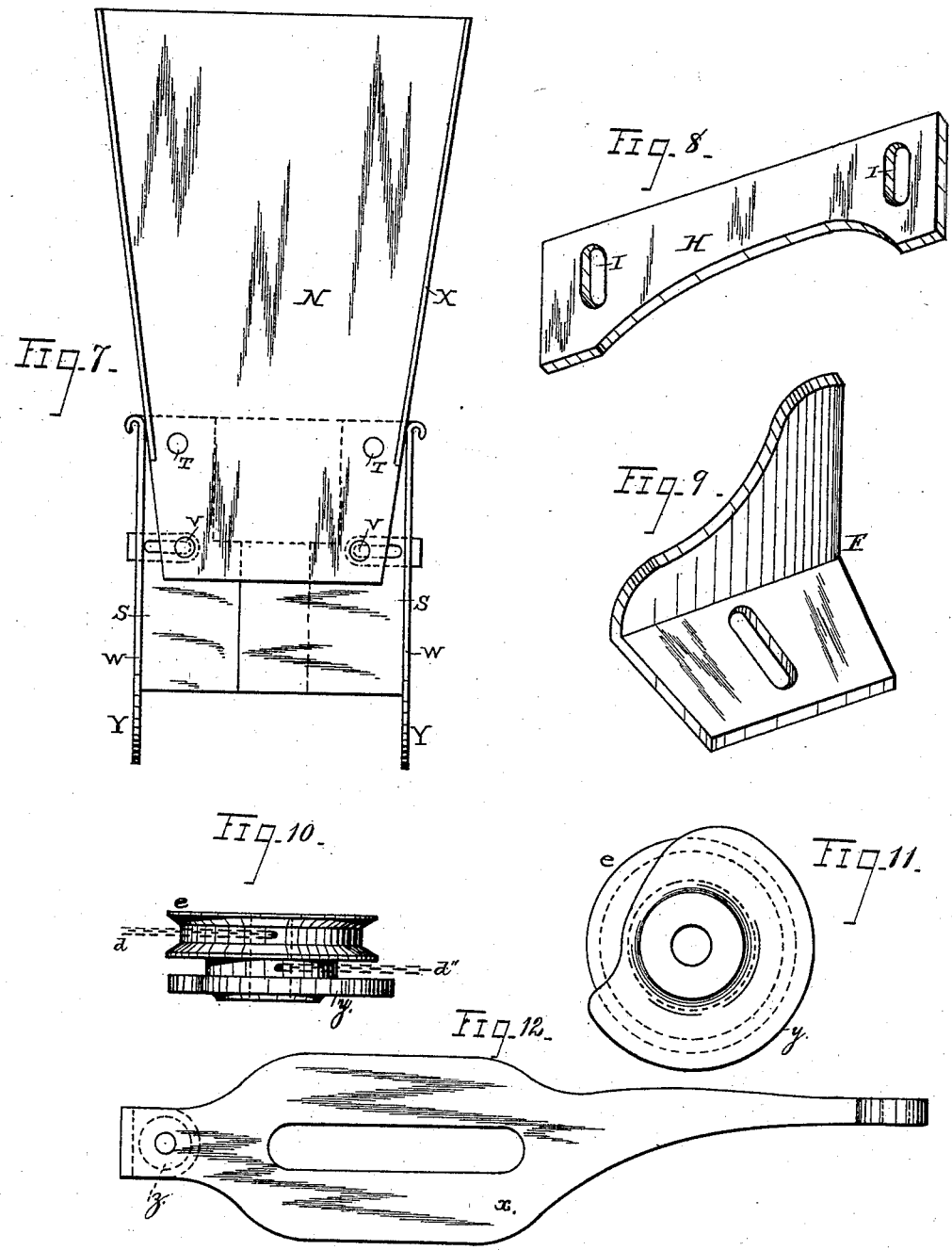
WITNESSES: 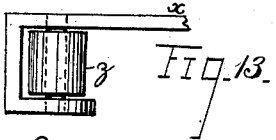 INVENTOR:
John R. Williams,
BY Chas. C. Gill, ATTY United States Patent Office.

JOHN R. WILLIAMS, OF NEWARK, NEW JERSEY, ASSIGNOR TO THE JOHN R. WILLIAMS COMPANY, OF NEW YORK, N. Y.

CIGAR-BUNCHING MACHINE.

SPECIFICATION forming part of Letters Patent No. 380,969, dated April 10, 1888.

Application filed November 14, 1887. Serial No. 255,048. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Bunching Machines, of which the following is a specification.

The apparatus by which the invention is carried into effect is described in detail hereinafter, and illustrated in the accompanying drawings, and embodies certain features, hereinafter pointed out, of the cigar-bunching machines shown and described in Letters Patent of the United States heretofore issued to me, and dated and numbered, respectively, as follows: April 8, 1879, No. 214,015; August 3, 1886, No. 346,627; December 7, 1886, No. 353,907, and September 6, 1887, No. 369,419.

Figure 1:
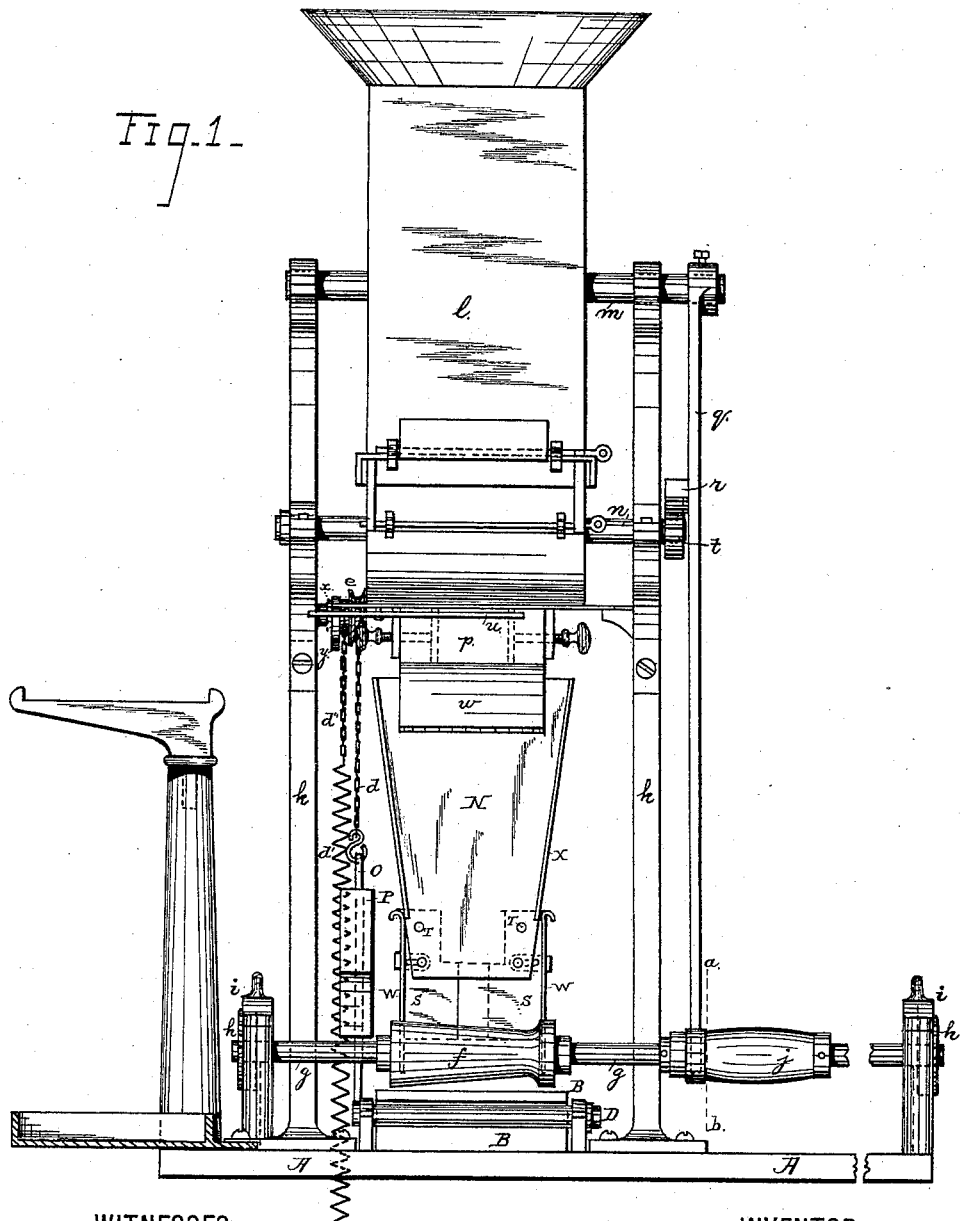
Figure 2:
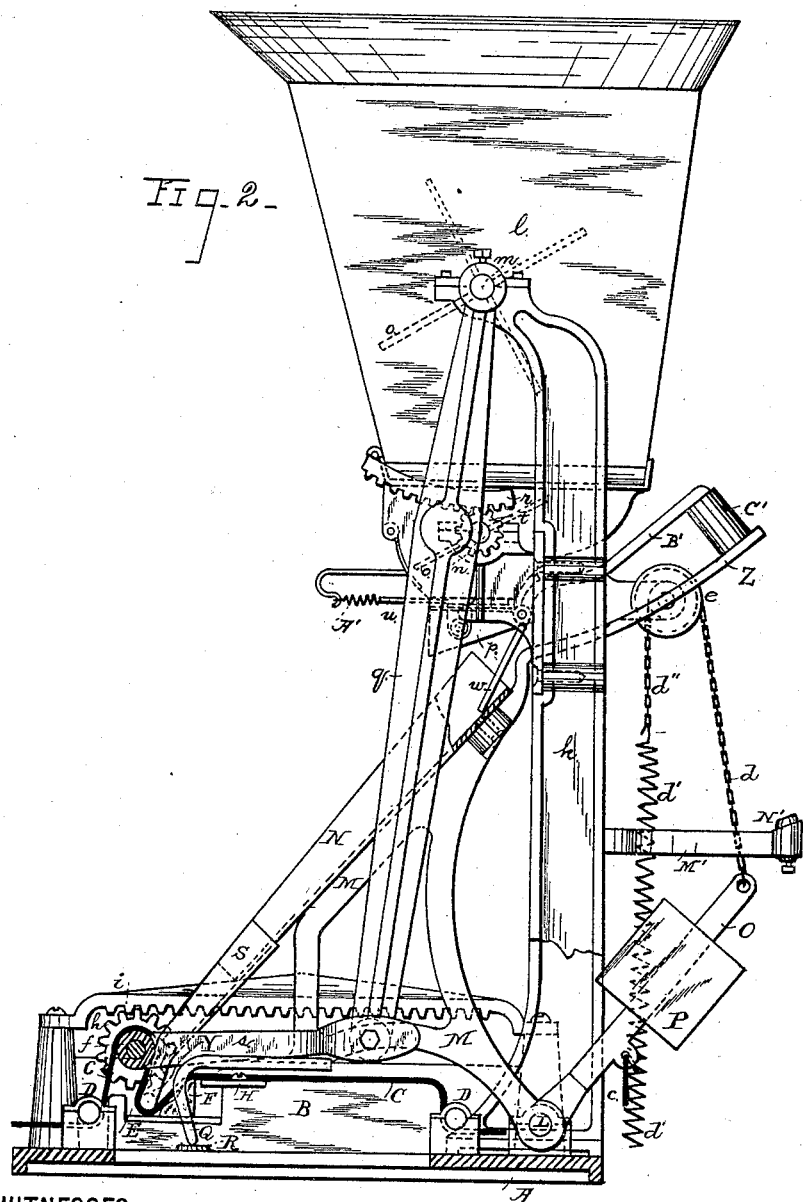

Referring to the accompanying drawings, Figure 1 is a front elevation of a cigar-bunching machine constructed according to the invention, the legs supporting the base of the machine and the rolling-apron being omitted. Fig. 2 is a side elevation of the machine, the base-plate being in section on the dotted line *a b* of Fig. 1. Fig. 3 is a similar view to Fig. 2, with the exception that in this figure the movable elements are shown in an opposite position to that illustrated in Fig. 2. Fig. 4 is a detached top view of the rolling-table, the apron being omitted. Fig. 5 is a side elevation, looking at the left hand of the machine illustrated in Fig. 1, the movable parts thereof being in their lower position. Fig. 6 is a similar view to Fig. 5, looking at the opposite side of the machine, and illustrating the movable parts thereof in their upper position. Fig. 7 is a face view of the chute for conveying the tobacco from the elevated charge-box to the rolling-apron. Fig. 8 is a detached perspective view of the bunch-shaping plate applied to the upper surface of the rolling-table immediately at the rear of the pocket for receiving the filler-tobacco. Fig. 9 is a detached perspective view of one of the plates located at the opposite ends of the pocket in the rolling-table to receive the filler-tobacco, said plates being laterally adjustable. Figs. 10 and 11 represent, respectively, the edge and face of the cam for operating the cut-off plate located between the main receptacle and the charge-box. Fig. 12 is a face view of a plate operated by the cam illustrated in Figs. 10 and 11; and Fig. 13 is a detached edge view of that end of the plate illustrated in Fig. 12, which remains in contact with the cam shown in Fig. 11.

In the drawings, A designates the base-plate of the machine, which will be supported upon suitable legs, as illustrated in Figs. 5 and 6, and is provided with the elevated portion B, which forms the rolling-table, over which is arranged the stationary belt or apron C, the ends of the latter being clamped beneath the rods D. In the front end of the table B is formed the recess or mold E, (see Figs. 2, 3, and 4,) which will be of suitable size to permit the formation therein of the pocket in the rolling-apron C to receive the tobacco, and is provided with the laterally-adjustable end plates, F, a detached view of one of which is illustrated in Fig. 9, and which are secured in position by the screws G, as shown in Fig. 4. The front edges of the vertical portion of the plates F incline downward to the base of the recess or mold E, in order that the apron C may rest against them, as illustrated in Fig. 2, while said apron is in position to receive a charge of tobacco from the charge-box, hereinafter referred to.

The plates F are laterally adjustable in order that their position may be regulated according to the length of the bunch to be produced. The front edges of the vertical portions of the plates F support the outer edges of the apron, but permit the central parts of the apron to be depressed by the tobacco in order that the middle parts of the bunch may receive a form similar to that of a well-finished cigar.

Upon the table B, at the rear edge of the recess E, is provided the adjustable forming-plate H, the front edge of which projects over the recess E, and is given an outline conforming to the style of the bunch to be produced, this outline varying according to the wish of the manufacturer. The plate H is provided with slots I, and is secured upon the table B by means of screws J passing downward through said slots and entering the table. The plate H may be adjusted upon the table B, with relation to the recess or mold E, by reason of the slots I and screws J, according to the size and form of the bunch to be produced and the character of the stock used in the manufacture of the cigar.

At the rear end of the table B may be provided a small bunch-receiver, K, of any well-known construction. In the rear of the table is mounted in suitable bearings the shaft L, upon which is secured a section or casting, M, of suitable form to support the chute N, by which the tobacco is directed from the charge-box, hereinafter referred to, to the pocket in the rolling-apron. The casting M has a hinged movement with the shaft L, as illustrated in Figs. 2 and 3, and is provided at the rear of the base-plate A with the rod O, carrying the counterbalance-weight P. Upon the front portion of the casting M is provided, at opposite sides of the table B, the arms Q, which, when the casting is in its lower position, as illustrated in Figs. 2 and 5, impinge the buffers R, of some soft material, such as rubber or felt, and thereby prevent any rattling or jarring of the parts connected with the casting. A rest, M', also having a soft buffer, N', is provided for the hinged section M when it has been thrown to its upward position, as shown in Fig. 3.

The lower end of the chute N is provided with the laterally-movable wings S, which are secured by the pivots T, and are directed as to their movement by the pins V, secured to the lower end of the chute and passing through slots formed in said wings. The wings S overlap each other at their inner portions, the wing at the right hand side of the chute overlapping the wing at the left-hand side thereof, as illustrated by full lines in Fig. 7, the dotted line indicating the inner edge of the left-hand wing located beneath the wing at the right hand of the chute. The wings S have also the sides W, which form a continuation of the sides X of the chute N, and are provided with extensions or arms Y, protruding downward below the floor of the wings, as indicated in Fig. 7, and serving, when the hinged section or casting M is in its downward position, as indicated in Fig. 2, to force the slack of the apron C into the recess or mold E of the rolling-table, as indicated in said Fig. 2, thereby forming a well-defined pocket to receive the charge of tobacco for the bunch.

The purpose of the wings S is to enable the operator to vary the width of the lower end of the chute according to the length of the cigar to be produced. If it should be desired to produce cigars of only one standard length, the wings S need not be adjustable. The wings S form a continuation of the chute N, and the extensions Y, while being the termination of the sides of the chute and serving to form the pocket in the apron within the mold E, prevent, also, the tobacco from escaping at the ends of the pocket upon its first descent down the chute N. The upper portion of the casting M is provided with an arm, Z, which will be hereinafter referred to; and said casting is connected with a pitman-rod, $c$, and with the chain $d$, the pitman-rod being operated by the usual foot-treadle, as illustrated in Figs. 5 and 6, for the purpose of turning the casting M upward to the position illustrated in Figs. 3 and 6, while the chain $d$, among its other functions, facilitates, in connection with the wheel $e$ and spring $d'$, the returning of the casting to its lower position, being that illustrated in Figs. 2 and 5. The chain $d$ is secured at its upper end in the groove provided for it to the wheel or roller $e$, as illustrated in Fig. 10.

The spring $d'$ is secured at its lower end to the frame of the machine, and has at its upper end a short section of chain, $d''$, which also is secured to the wheel or roller $e$ within a suitable groove. (See Fig. 10.) When the hinged section or casting M is turned upward, as shown in Fig. 3, the chain $d$ being drawn downward is unwound from the roller or wheel $e$, the latter being rotated toward the rear, and at the same time this rotation of the wheel $e$ causes the chain $d''$ to be wound thereupon, and thus extends the spring $d'$, which consequently exerts a tension on the wheel tending to reverse its movement. As soon as the foot is released from the treadle the tension of the spring $d'$ reverses the movement of the wheel $e$ and (the chain $d$ being by that operation rewound upon the wheel) facilitates the return of the hinged section M to its lower position, being that illustrated in Figs. 2 and 5. The chains $d$ and $d''$, in addition to affording a medium through which the tension of the spring $d'$ may act upon the hinged section M, operate to rotate the wheel $e$, and this in turn actuates, through a cam and plate hereinafter described, the cut-off valve $u$, also described hereinafter.

The roller utilized for rolling the bunch is lettered $f$, and is mounted upon the horizontal shaft $g$, extending entirely across the base-plate A, and is provided upon its ends with the pinions $h$, engaging the inverted racks $i$, located at opposite sides of the machine, the roller $f$, with its shaft, pinions, and racks, being the same in every respect as the like mentioned elements illustrated in Letters Patent of the United States granted to me on the 7th day of December, 1886, and numbered 353,907. Upon the roller-shaft $g$ is provided the handle $j$, by which the shaft is moved during the process of rolling the bunch, as described in said patent of December 7, 1886, and in Letters Patent of the United States, numbered 369,419, granted to me September 6, 1887, for improvements in cigar-bunching machines. Upon the base-plate A is secured the standards $k$, supporting between their upper portions the receptacle $l$, which contains the scrap-tobacco used in the manufacture of the bunch. The receptacle $l$ is provided with the shafts $m$ $n$, respectively, passing through the same and having bearings in the standards $k$, the shafts within the receptacle $l$ being provided with arms $o$, as shown by dotted lines in Fig. 2, which serve to agitate and feed the tobacco downward to the charge-box $p$ during the operation of the machine. Upon the right-hand end of the shaft $m$ is secured the upper end of the rod $q$, which carries the segmental rack $r$, and is pivotally secured at its lower end to the horizontal arm $s$, the front end of which is secured upon the shaft $g$. The segmental rack $r$ engages the pinion $t$, secured upon the end of the shaft $n$, as indicated in Figs. 1, 2, and 3, and said rack is of sufficient length to rotate the pinion $t$, and with it the shaft $n$, during each forward and backward movement of the shaft $g$ and rods $q$ $s$, as hereinafter described.

The receptacle $l$, with the charge box $p$, is illustrated in the Letters Patent heretofore granted to me and above referred to, and is not sought to be separately claimed herein.

The lower end of the receptacle $l$ is provided with the usual aperture, through which the tobacco is fed into the charge box $p$, and also with a cut-off plate or valve, $u$, said plate being the same as the like element illustrated in the said patents hereinbefore referred to, and also in Letters Patent No. 346,627, issued to me August 3, 1886, for improvements in cigar-machines, and Letters Patent No. 214,015, issued to me April 8, 1879, for improvements in cigar-bunching machines.

The movements of the cut-off plate $u$ are such that said plate is closed over the charge-box $p$ when the door $w$ at the bottom of said box is open, and is away from the top of said charge-box when said door $w$ is closed. The plate $u$ is operated to either close over the charge-box or move therefrom by means of the plate $x$ and cam $y$, the latter forming a part of or being rigidly connected with the wheel $e$, hereinbefore referred to, and having an edge upon which the roller $z$ of said plate $x$ travels, said roller being thereon retained by the spring $A'$. The spring $A'$ is secured to the end of the plate $u$, opposite to the point where the front end of the plate $x$ is secured to said plate $u$, and hence the tension of the spring is felt by the plate $x$. This tension operates to draw the plate $x$ toward the spring, and thereby preserves the contact of the roller $z$ with the cam $y$, which, as a consequence, during its rotation reciprocates the plate $x$, and thus, through the said plate, opens and closes the cut-off plate or valve $u$. The rotation of the wheel $e$ and cam $y$ is accomplished at the proper time by the chains $d$ and $d''$ passing over said wheel during the upward and downward movements of the hinged section or casting M, carrying the chute N. The movement of the hinged section M controls, also, the opening and closing of the door $w$ at the bottom of the charge-box $p$. The door $w$ has a rearwardly-extending arm, B', carrying a weight, C', which, when the hinged section M is in its upward position, as shown in Figs. 3 and 6, overbalances the weight of the door $w$, and thus closes it. When, however, the hinged section is moved to its lower position, being that illustrated in Figs. 1, 2, and 5, the arm Z raises the weight C' and closes the door $w$.

In the operation of the machine, the hopper $l$ being filled with loose tobacco, the hinged section M and chute N are first elevated by the pressure of the foot applied to the treadle and the roller shaft $g$ is pushed to the rear edge of the table B. The shaft $g$ is then drawn to the front edge of the table to its former position and a "binder" placed on the apron C directly over the mold E, after which the foot-treadle will be released and the hinged section and chute allowed to return to their lower position. The effect of elevating the section M is to permit the door $w$ to close, and to move the cut-off plate $u$ from over the charge-box $p$, and of the first movement of the roller-shaft $g$ to the rear edge of the table B is to cause (through the arm $q$, rack $r$, and pinion $t$) the feed-shafts $m$ $n$ to feed the loose tobacco into the charge-box $p$. The effect of the first return-movement of the roller-shaft $g$ is to impart an additional rotary movement to the feed shafts $m$ $n$, and of the first descent of the section M and chute N is to permit the cut-off plate $u$ to close over the charge-box, to open the door $w$, and to depress the slack of the apron into the mold E, forming a pocket therein, into which the tobacco formerly in the charge-box will be directed by the chute N. After the charge of tobacco has thus reached the pocket in the apron the hinged section and chute will be again elevated by pressure applied to the foot-treadle, (closing the door $w$ and opening the plate $u$,) and the roller-shaft $g$ is again moved to the rear edge of the table B. During this movement of the shaft $g$ the tobacco in the pocket of the apron will be rolled with the binder into a "bunch" and be moved over the rear edge of the table B, the shafts $m$ $n$ in the meantime feeding another charge of tobacco into the box $p$. The shaft $g$ will thereupon be immediately returned to the front edge of the table B, another binder placed on the apron over the mold E, and the section and chute permitted to return to their lower position, when another charge of tobacco will slide down the chute into the pocket formed in the apron, and the hinged section is then again elevated and the shaft $g$ pushed to rear edge of the table B, causing another bunch to be rolled.

The operation above described may be repeated as often as desired, each movement of the roller-shaft $g$ toward the rear causing "filler tobacco" to be fed into the charge-box and a bunch to be rolled, and each downward movement of the hinged section and chute causing the door $w$ to close, the valve-plate $u$ to open, and a pocket to be formed in the apron adapted to receive a charge of tobacco.

Upon the table A, at the left-hand side of Fig. 1, I illustrate a mold-supporting device similar to that shown in Fig. 2 of my aforesaid patent, dated September 6, 1887; but said device is not sought to be claimed herein.

What I claim as my invention, and desire to secure by Letters Patent, is—

1. The stationary rolling-table having the mold or recess E therein, the apron resting on said table and extending across said mold, and the reciprocating roller, combined with the elevated hopper for holding the filler-tobacco, and a tilting chute, N, for directing each charge of the filler-tobacco from the elevated hopper to the said apron, the lower end of said chute having side extensions, Y, adapted to depress the said apron into the said mold to form the pocket for the charge of tobacco, substantially as and for the purposes set forth.

2. The rolling-table having the mold or recess therein, the forming-plate on the rear edge of said mold, the apron resting on the table and extending across the mold, and the reciprocating roller, in combination with an elevated hopper for holding the filler-tobacco, and a tilting chute for directing each charge of the tobacco downward to the apron, the lower end of the chute having side extensions adapted to depress the said apron into said mold to form the pocket, substantially as set forth.

3. The rolling-table having the mold or recess therein, the apron resting on said table and extending across said mold, and the reciprocating roller, in combination with the elevated hopper, the hinged section, and the chute carried by said section for directing each charge of the tobacco downward to the apron, the lower end of the chute having side extensions adapted to depress the said apron into said mold to form the pocket, substantially as set forth.

4. The rolling-table having the mold or recess therein, the apron resting on said table and extending across said mold, longitudinally-adjustable end pieces for the mold, and the reciprocating roller, in combination with an elevated hopper and a tilting chute for directing each charge of the tobacco downward to the apron, the lower end of the chute having side extensions adapted to depress the said apron into said mold to form the pocket, substantially as set forth.

5. The rolling-table, mold, apron, and reciprocating roller, in combination with the elevated hopper for holding the filler-tobacco, a chute for directing each charge of the tobacco to the apron, the feed-shaft $n$ in said hopper, joined rods extending from said hopper to the axle of the said reciprocating roller, and gearing connecting the axle of said feed-shaft with said rods, whereby with each movement, either forward or backward, of the reciprocating roller the feed-shaft will be operated, substantially as set forth.

6. The rolling-table having the mold or recess therein, the apron resting on said table and extending across said mold, and the reciprocating roller, in combination with an elevated hopper for holding the filler-tobacco, and a tilting chute for directing each charge of tobacco downward to said apron, said chute having adjustable side wings and also extensions at its lower end adapted to depress the apron into said mold to form the pocket, substantially as set forth.

7. The rolling-table having the mold or recess therein, the apron resting on said table and extending across said mold, and the reciprocating roller, in combination with the elevated hopper, the charge-box below said hopper and having a door at its bottom, the hinged section having an arm adapted to open said door, and the chute carried by said section and leading from the charge-box to the apron, the lower end of the chute having side extensions adapted to press the apron into the said mold to form the pocket, substantially as set forth.

8. The rolling-table having the recess therein, the apron extending across said table and recess, the plates F in the ends of said recess and having their front edges inclined, and the reciprocating roller, in combination with the hinged section, the chute carried by said section, an elevated hopper for the filler-tobacco, and extensions Y, at the lower end of the chute adapted to form the pocket of the apron within the recess E, substantially as set forth.

9. The rolling-table, mold, apron, and reciprocating roller, in combination with the elevated hopper for holding the filler-tobacco, a chute for directing the tobacco to the apron, the feed-shafts $m$ $n$ in said hopper, the joined rods $q$ $s$, extending from the shaft $m$ to the shaft of the reciprocating roller, the segment $r$ on rod $q$, and the pinion on the shaft $n$ engaging said segment, substantially as set forth.

10. In a cigar-bunching machine, the table, apron, and reciprocating roller, combined with the elevated hopper, the charge-box $p$ at the lower end of the hopper, the cut-off plate $u$ between the said hopper and box, the spring A′, connected with said plate $u$, the rotating cam $y$, and plate $x$, one end of said plate $x$ being connected with the plate $u$, and the other end being in contact with said cam, substantially as set forth.

Signed at New York, in the county of New York and State of New York, this 7th day of November, A. D. 1887.

JOHN R. WILLIAMS.

Witnesses:
CHAS. C. GILL,
ROBERT A. PORTEOUS.